United States Patent
Wang et al.

(10) Patent No.: US 7,702,304 B2
(45) Date of Patent: *Apr. 20, 2010

(54) ADAPTIVE BEAM FORMING RECEIVER

(75) Inventors: James June-Ming Wang, San Marino, CA (US); Meng-Chang Doong, Alhambra, CA (US)

(73) Assignee: Motia Inc., San Mateo, CA (US)

( * ) Notice: Subject to any disclaimer, the term of this patent is extended or adjusted under 35 U.S.C. 154(b) by 1116 days.

This patent is subject to a terminal disclaimer.

(21) Appl. No.: 11/237,439

(22) Filed: Sep. 28, 2005

(65) Prior Publication Data

US 2006/0073801 A1    Apr. 6, 2006

(51) Int. Cl.
*H04B 17/02*    (2006.01)
(52) U.S. Cl. .................. 455/135; 455/133; 455/137; 375/144; 375/142
(58) Field of Classification Search ........... 455/132, 455/133, 134, 135, 137
See application file for complete search history.

(56) References Cited

U.S. PATENT DOCUMENTS 7,224,758 B1 *  5/2007  Banister ............... 375/358

\* cited by examiner

*Primary Examiner*—Nay A Maung
*Assistant Examiner*—Richard Chan
(74) *Attorney, Agent, or Firm*—Patentry

(57) ABSTRACT

The present invention provides a method and system for operating a wireless communication system in which received signals from a plurality of antennas are weighted and combined with a beam forming operation to form an output signal. In an embodiment of the present invention, beamforming operations are performed with maximal ratio combining (MRC) and an interference nulling algorithm (INA). The INA receives an error signal which is 180° out of phase with a combination of the channels for individual antennas, referred to as the SUM channel. The error signal is determined by complex conjugate multiplication of the individual signals and a reference complex signal. The weight amplitude is controlled by weight normalization to provide faster convergence and prevent integrator overflow.

30 Claims, 13 Drawing Sheets

A. Convention Implementation

B. Implementation with less delay differences

ADAPTIVE BEAM FORMING RECEIVER

CROSS REFERENCE TO RELATED APPLICATION

This application claims the benefit of U.S. patent application Ser. No. 10/732,003, filed Dec. 10, 2003, the entirety of which is hereby incorporated by reference into this application.

BACKGROUND OF THE INVENTION

1. Field of the Invention

This invention relates generally to wireless communication systems. More particularly, it relates to a wireless communication system using a plurality of antenna elements with weighting and combining techniques for optimizing antenna diversity and combining gain.

2. Description of the Related Art

Recently, the market for wireless communications has enjoyed tremendous growth. Wireless technology now reaches or is capable of reaching virtually every location on the face of the earth. Hundreds of millions of people exchange information every day using pagers, cellular telephones and other wireless communication products.

With the appearance of inexpensive, high-performance products based on the IEEE 802.11a/b/g Wireless Fidelity (Wi-Fi) standard, acceptance of wireless local area networks (WLANs) for home, Small Office Home Office (SOHO) and enterprise applications has increased significantly. IEEE 802.11b/g is a standard for a wireless, radio-based system. It operates in the unlicensed 2.4 GHz band at speeds up to 11M bits/sec for IEEE 802.11b and 54 M bits/sec for IEEE 802.11g. The IEEE 802.11b/g specification sets up 11 channels within the 2.4 GHz to 2.4835 GHz frequency band which is the unlicensed band for industrial, scientific and medical (ISM) applications. IEEE 802.11a is another standard for a wireless, radio-based system in the ISM band. It operates in the unlicensed 5-GHz band at speeds up to 54 M bits/sec.

It has been found that WLANs often fall short of the expected operating range when actually deployed. For example, although a wireless Access Point (AP) is specified by a vendor as having an operating range of 300 feet, the actual operating range can vary widely depending on the operating environment.

In particular, WLAN performance can be greatly degraded by direct and multipath radio interference. Multipath occurs in wireless environments because the radio frequency (RF) signal transmitted by the subscriber is reflected from physical objects present in the environment such as buildings. As a result, it undergoes multiple reflections, refractions, diffusions and attenuations. The base station receives a sum of the distorted versions of the signal (collectively called multipath).

Similarly, in any indoor wireless system, multipath interference effects occur when the transmitted signal is reflected from objects such as walls, furniture, and other indoor objects. As a result of multipath, the signal can have multiple copies of itself, all of which arrive at the receiver at different moments in time. Thus, from the receiver's point of view, it receives multiple copies of the same signal with many different signal strengths or powers and propagation delays. The resultant combined signal can have significant fluctuation in power. This phenomenon is called fading.

There are additional elements of performance degradation in a network of 802.11b/g WLAN access points (APs). Since the 802.11b/g channel bandwidth is approximately 16 MHz, only three non-overlapping channels operating in proximity can be accommodated without interfering with one another. The channel re-use factor imposes a severe restriction on implementation of 802.11b/g based systems which requires significantly more effort in the network deployment, and increases the chances of interference and packet collision especially within an environment with a dense user cluster, such as in an office building or apartment building. It is not usual that a user can see more than 10 different APs simultaneously. Multipath interference further complicates the situation because being physically closer to an AP does not mean the signal from the AP is stronger. Signal propagates from a different path from a remote AP can have stronger power. Thus, site survey to determine the signal propagation is often required for a corporation trying to deploy multiple APs within an office complex.

Several approaches for improving the operating performance and range in a fading environment have been suggested. In one conventional approach, selection antenna diversity is used to reduce the effect of multipath fading. Multiple antennas are located in different locations or employ different polarizations. As long as the antennas have adequate separation in space or have a different polarization, the signal arriving at different antennas experiences independent fading. Each antenna can have a dedicated receiver or multiple antennas can share the same receiver. The receiver(s) checks to see which antenna has the best receiving signal quality and uses that antenna for the signal reception. The performance gain thus achieved is called diversity gain. The performance gain increases with the number of diversity antennas. The drawback of the selection diversity approach using a single shared receiver is that fast antenna switching and signal quality comparison is required. Since an 802.11(a, b, g) signal has a short signal preamble, only two diversity antennas are typically employed. This achieves a diversity gain of approximately 6 dB in a flat Rayleigh fading environment at the required frame error rate. The diversity gain decreases to 3 dB when delay spread is 50 ns and 0 dB when delay spread is 100 ns.

In another conventional approach, signal combining is used to provide improved performance in a fading environment. Signal combining techniques employ multiple spatially separated and/or orthogonally polarized antennas. The received signal is obtained by combining the signals from the multiple antennas. One technique for providing optimal signal quality is known as maximal ratio combining (MRC). To achieve the best signal quality, the received signal from each antenna is phase-shifted such that the resultant signals from all antennas are in phase. In addition, the signal from each antenna is scaled in amplitude based on the square root of its received signal-to-noise ratio.

Another known approach to achieve performance improvement is through equalization, either in the time or frequency domain. In this technique, the multipaths arriving at the receiver are delayed, phase shifted, and amplitude scaled before they are combined (equalized). Equalization typically works better when the delay spread is large (>100 ns). The performance enhancement as a result of equalization adds to the diversity gain of antennas.

In U.S. patent application Ser. No. 10/732,003, filed Dec. 10, 2003 entitled Wireless Communication System Using a Plurality of Antenna Elements with Adaptive Weighting and Combining Techniques, a closed loop operation system which can simultaneously perform signal combining using MRC and adjacent channel interference suppression using INA are proposed. The proposed approach can be unstable in some cases and unable to achieve fast convergence and integrator overflow.

Interference suppression and range enhancement approaches are most effective if the solutions fit in a PCMCIA form factor. Solutions typically are implemented with ASIC (application specific integrated circuit) to reduce the required space. A WLAN typically employs two spatially separated omni-directional antennas to have better coverage and each antenna typically requires approximately a quarter wavelength in the resonant dimension. A solution that requires more than two antenna elements needs to fit within the PCMCIA form factor so as not to limit the available combining and diversity gain.

Additional requirements for WLAN performance enhancement are low power consumption, minimal implementation cost, and high reliability. Since WLAN client devices are typically installed in battery powered notebook computers, a low power and low cost solution are criteria for the success of a commercial product. The use of digital signal processing techniques for any solution involving multiple antenna elements uses high power and has high costs. Since each antenna element requires two high-speed analog to digital converters (ADC), a solution involving four antenna elements would use eight high speed ADCs, thereby having higher cost and higher power consumption.

Alternatively, analog implementations are typically complicated by poor component tolerances and high IC process and temperature-dependent parameter variations.

It is desirable to provide an enhanced communication system to provide diversity, combining gain or interference suppression techniques which can be self-aligned and converges to the correct parameter values, independent of process, temperature, and component variations.

SUMMARY OF THE INVENTION

The present invention employs multiple antenna elements and signal combining techniques to achieve both antenna diversity and combining gain while simultaneously suppresses interference. To realize the maximum achievable diversity gain, the received signals at the antenna elements need to experience independent fading. Typically, the signal correlation between any pair of antenna elements needs to be less than 0.5 for interference suppression and 0.7 for diversity gain with less than a 1 dB loss in performance as compared with uncorrelated fading. The present invention can apply, but is not restricted to, spatially diversity, polarization diversity, angular diversity, or pattern diversity. The diversity gain that can be achieved increases with the number of antenna elements. The increase in diversity gain is not a linear function of the number of antenna elements. The incremental diversity gain decreases as the number of antenna elements increases. Accordingly, most of the diversity gain is achieved with first few antenna elements. As far as interference suppression is concerned, the number of interfering signals that can be suppressed simultaneously is equal to the number of antenna minus one. Typically, 15 dB or higher interference suppression can be achieved, depending on accuracy of the implementation.

The present invention provides a method and system for operating a wireless communication system in which received signals from a plurality of antennas are weighted and combined with a beam forming operation to form an output signal. The beam forming operation determines weights adjusted to increase a desired signal power in the output signal while reducing the power in the output signal of adjacent channel components.

In an embodiment of a conventional system, beam forming operations are performed with maximal ratio combining (MRC) while the interference suppression is performed with a novel algorithm referred to as an interference nulling algorithm (INA). The MRC derives an error signal for each antenna element, which is proportional to envelop of the corresponding input signal and has a phase equal to the phase difference of the input signal and a combined signal derived from adding weighted signals from all individual antennas, referred to as the SUM channel. The error signal is determined by complex conjugate multiplication of the individual signal for each antenna element and the reference SUM channel signal. The error signals are low pass filtered (or integrated) to become the antenna weight for each channel. The INA derives an error signal for each antenna element, which is proportional to envelop of the corresponding input signal and has a phase equal to 180 degree plus the phase difference of the input signal and a combined signal derived from adding weighted signals from all individual antennas, referred to as the SUM channel. The error signal is determined by complex conjugate multiplication of the individual signals and a "negative" reference SUM channel signal. It is desirable to simultaneously achieve diversity and combining gain and suppress the adjacent channel by combining the weight generation for MRC and that for INA, as described above, to generate antenna weights similar to those of MMSE combining.

In the conventional implementation of the maximal ratio combining (MRC) combined with interference nulling algorithm (INA) technique, the downconverted signal from each antenna element is split into two paths, one passed through channel filter and one passed through the adjacent channel filter. Two AGC loops are employed. The first AGC loop is used to normalize the signal magnitude. In this loop, the signal power from four channels are computed and added, the total power is then compared to a threshold. The error is then used to drive an integrator whose output adjust the signal amplitude. The second AGC loop is used to find the power of the summation channel and used to control the weight amplitude.

The low pass filtered signal is used to process the MRC algorithm while the bandpass filtered signal is used to process the INA. This implementation achieves MRC only when the desired signal is present. It is also capable of suppressing adjacent channel interference signal, which can be substantially larger than the desired signal.

The conventional implementation in some cases can have difficulty keeping the multiple AGC loops stable under certain conditions. Specifically, if the fast convergence is desired, stability is difficult to achieve due to interaction between the two loops. Typically, the response time of the two loops needs to differ by a factor of 10 to prevent interaction between the loops, which may be difficult to realize in practical implementations.

In an embodiment of the present invention, the weight amplitude controlled by the second AGC loop is substituted by weight normalization embedded hardware to provide faster convergence. Additionally, a feedback mechanism in the weight normalization is used to prevent integrator (low pas filter) overflow for the error signal.

In the present invention, the antenna weights and combining are performed at the RF frequency, RF combining, instead of at the baseband. Accordingly, in an embodiment of the present invention, a beam former is located between the antenna and the receiver/transmitter interface. RF combining simplifies the interface between the beam former and the transmitter/receiver. Typically, this interface is the same for most vendors whereas the baseband interface differs from vendors to vendors. Accordingly, the approach of the present invention enables beam former processing to be compatible with most vendors.

In the present invention, closed loop blind beamforming is employed. The closed loop operation is continuously active with or without the presence of signal and/or interference. In contrast to an open loop implementation, in which signal detection, acquisition, synchronization are required before the beamforming operation can be performed, closed loop implementation requires minimum amount of preprocessing and control. The present invention operates on signal power and noise characteristics only. Accordingly, no additional signal format information is needed. Thus, the prevent invention can be easily adapted to different signal format and signal characteristics. This allows the present invention to be applied to a wide variety of wireless systems such as WiMax, cellular phone system, and satellite radio and/or video broadcast system.

The present invention provides substantial increase in operating range in a multipath-rich environment; an adaptive antenna null formation, which suppresses the interference arriving from directions other than the desired signal; a reduced deployment effort; cost effectiveness; power efficiency; process, temperature, component variation insensitivity; compactness; fast convergence; and compatibility with existing WLAN systems by exploiting the spatial and polarization antenna diversity and optimal signal combining.

The invention will be more fully described by reference to the following drawings.

DETAILED DESCRIPTION

Figure 1:
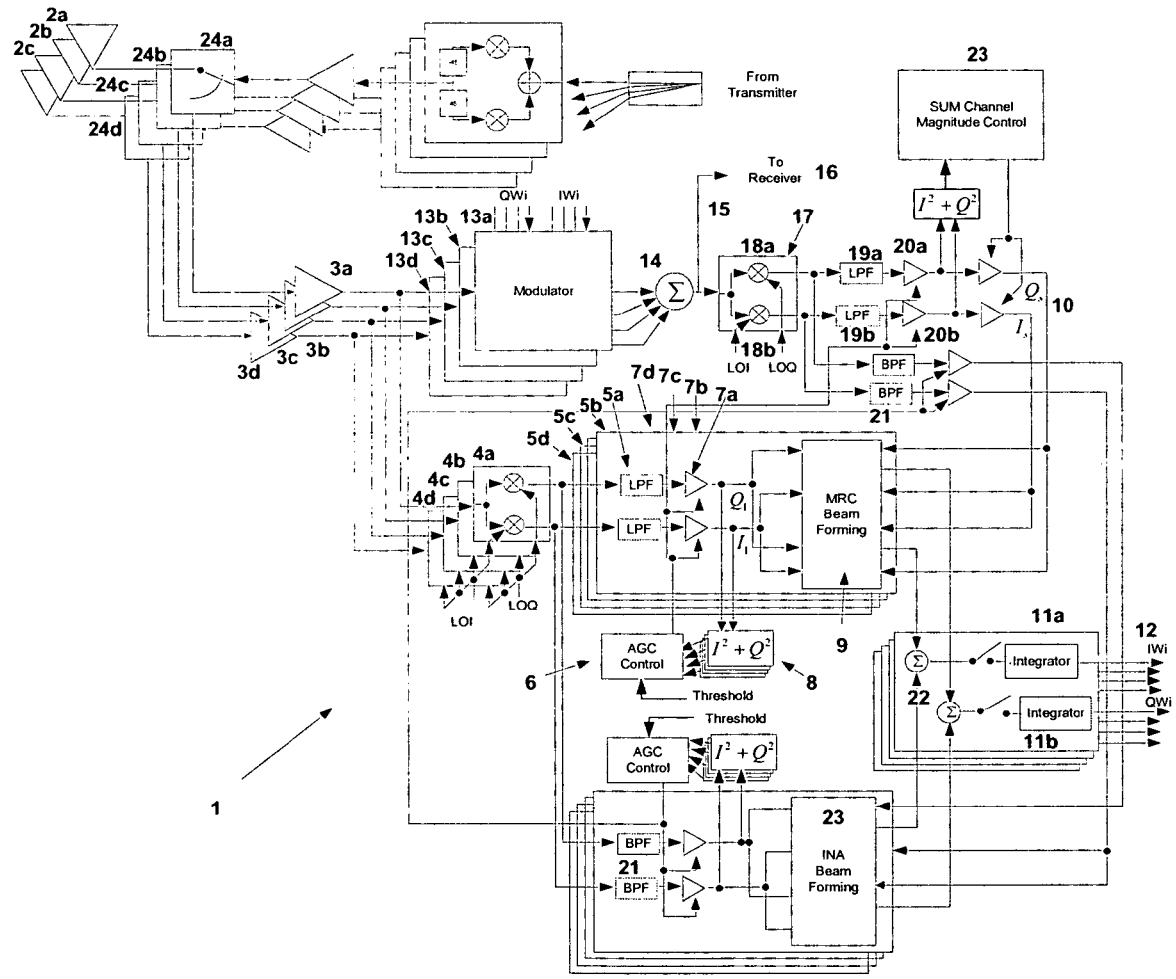
FIG. 1 is a schematic diagram of a conventional transmit and receive beam forming system of a combined MRC and INA implementation.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 shows a conventional method for beamforming system disclosed in U.S. patent application Ser. No. 10/732,003, filed Dec. 10, 2003, Wireless Communication System Using a Plurality of Antenna Elements with Adaptive Weighting and Combining Techniques. It is an illustration of wireless receive beam forming system including closed loop implementation of MRC (maximal ratio combining) and INA (interference nulling algorithm) for performing simultaneously signal combining and interference cancellation. Within wireless receive beam forming system 1 is a plurality of antennas 2a-d and along which wireless receive beam forming system 1 may receive (or transmit) signals. In this example, four antennas are used. It is appreciated to one of ordinary skill in the art that various embodiments using different numbers of antennas could be used with the teachings of the present invention. The signals are amplified in amplifiers 3a-d. The outputs of amplifiers 3a-d are downconverted in respective downconverters 4a-d. Each of downconverters 4a-d multiplies the output of respective amplifiers 3a-d by local oscillator inphase signal (LOI) and a local oscillator quadrature phase signal (LOQ) in respective multipliers 4a-b. The local oscillator centers its frequency at the frequency of the desired signal. It will be appreciated that various numbers of antennas and processing elements could be used in accordance with the teachings of the present invention.

The resultant signals are applied to respective low pass filters (LPF) 5a-d in a baseband automatic gain control (AGC) loop 6 that normalizes the signal level before the MRC algorithm. The filter is employed to extract the desired channel signal and attenuate all adjacent channels. AGC loop 6 provides consistent performance of wireless receive beam forming system 1 at different input signal levels. Variable gain amplifiers 7a-d are applied to respective output of LPF 5a-d. At the output of variable gain amplifiers 7a-d, power detectors 8 are applied to add the signal power of all antennas and compare the signal power to a threshold value. The difference between the signal power of all antennas and the threshold value can be integrated to maintain the signal level after AGC loop 6 at the same level and can be used to adjust the gain of variable gain amplifiers 7a-d. Accordingly, in this implementation, the MRC algorithm is able to work at different input signal levels.

MRC beam forming module 9 performs real time adaptive signal processing to obtain the maximum signal-to-noise ratio. In an implementation of MRC beam forming module 9 the antenna weights are used to align the phases of four antenna signals received from antennas 2a-d to the same phase and also scale the signal in proportion to the square-root of the signal-to-noise ratio in each individual channel. In one implementation, the signal envelope is used as an approximation to scale the signal in proportion to the square-root of the signal-to-noise ratio in each individual channel.

Figure 2:
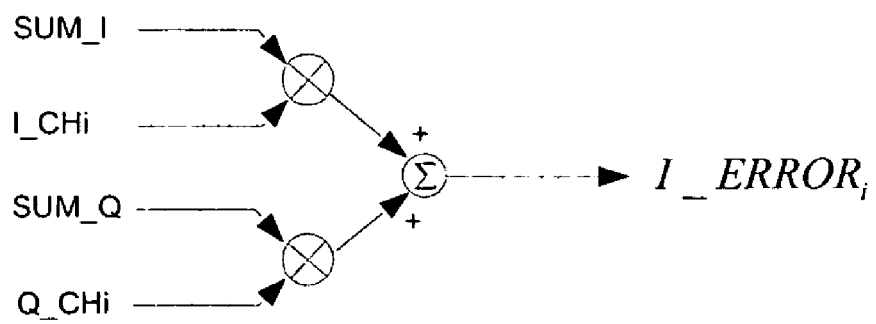
FIG. 2 is a schematic diagram of a MRC weight computation operation.
Figure 2:
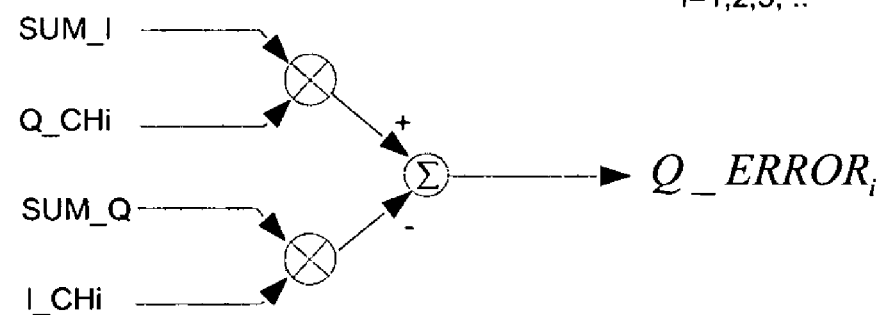

MRC beam forming module 9 performs computation of Cartesian antenna weights, as shown in FIG. 2. MRC beam forming module 9 provides baseband processing which performs complex conjugate multiplication of the output of a baseband I and Q channel filter 5a-d and variable amplifier 7a-d with a baseband reference I and Q channel from SUM channel as follows:

$$I\_ERROR_i = I_i * I_s + Q_i * Q_s$$

$$Q\_ERROR_i = I_i * Q_s - Q_i * I_s$$

The resultant signal (I_ERROR$_i$, Q_ERROR$_i$) at the output of MRC beam forming module 9 is a complex signal with phase equal to the difference of the reference complex signal and the individual signal and an envelope proportional to the envelope of the individual signal. Signal I_ERROR$_1$ is applied to integrator (low pass filter) 11a and signal Q_ERROR$_1$ is applied to integrator (low pass filter) 11b. The output of the integrator 11a-b is antenna weights IW$_1$, QW$_1$ 12. Similar operations are performed for channel 2, 3, 4 to obtain antenna weights IW$_2$, QW$_2$, IW$_3$, QW$_3$, IW$_4$, QW$_4$ 12. The antenna weights 12 and combining are performed at RF frequency.

The outputs of low noise amplifiers 2a-d are applied to respective modulators 13a-d and are each multiplied by antenna weight 12. Accordingly, the antenna weight is implemented using a modulator in which the baseband central signals are used to create phase shift and amplitude scaling in the signal without the use of a phase shifter and variable gain amplifier. The outputs of modulators 13a-d are combined in summer 14 to generate combined output signal 15. Combined signal 15 is forwarded to receiver 16.

Combined signal 16 is applied to downconverter 17 and is multiplied by local oscillator signals LOI and LOQ in respective multipliers 18a-b. The resultant signals are applied to low pass filters (LPF) 19a-b. In this case, the LPF is used to extract the desired channel signal and reject adjacent channel signals. Output from low pass filters (LPF) 19a-b are amplified with variable gain amplifiers 20a-b and is applied to MRC beam forming module 9 to be used for updating antenna weight 12, as described above.

Figure 3:
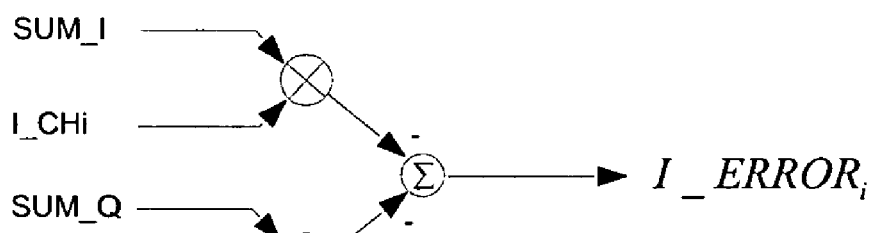
FIG. 3 is a schematic diagram of an INA weight computation operation.
Figure 3:
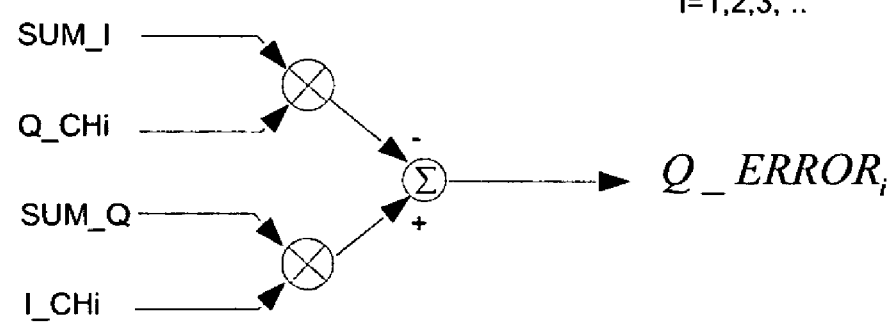

In FIG. 1, a separate INA loop is included for performing adjacent channel interference suppression. Following a similar operation as a MRC loop, a bandpass filter is used to extract the adjacent channel while rejecting the desired signal. The INA beamforming operation, shown in FIG. 3, is essentially the same as the MRC beamforming except that the polarity of the error signal is inverted as compared to that of the MRC one. The error signals of the MRC beamforming and INA beamforming operation are added 22 together before it is integrated (or low pass filtered) 11a-b.

The basic principle of the operation in INA beam forming module 23 is to derive an error signal (i.e., $-\mu \cdot \underline{rx}^*$) which is negative polarity of the combined signal at the SUM channel (i.e., $x = \underline{w}^H \underline{r}$). When the error signal is added (integrated) into the antenna weight, it acts to reduce the strength of the SUM channel, thereby canceling the interference signal. As the SUM channel magnitude becomes smaller and smaller, the error signal also becomes smaller and eventually reaches a steady state solution for the antenna weight and continues to adapt to the interference signal as it changes. The weights can be generated to combine the signals received from antennas 2a-d to increase gain and suppress interference, permitting operation even with noise and/or interference power that is greater than the signal power.

Figure 4:
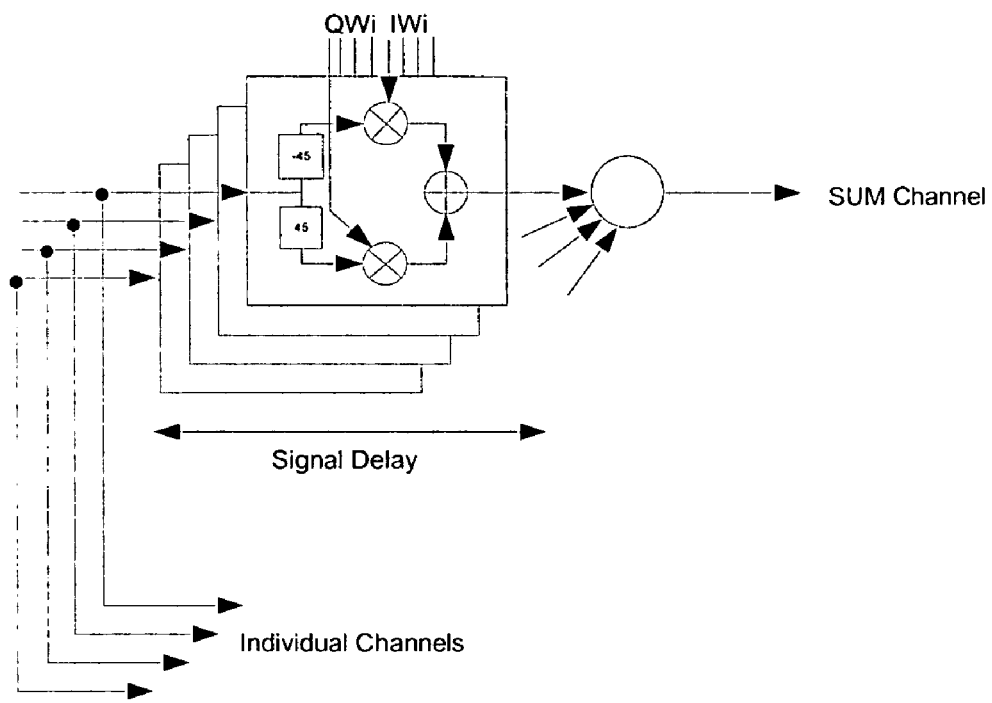
FIG. 4 is a schematic diagram of modulator implementation used in the beam forming system.
Figure 4:
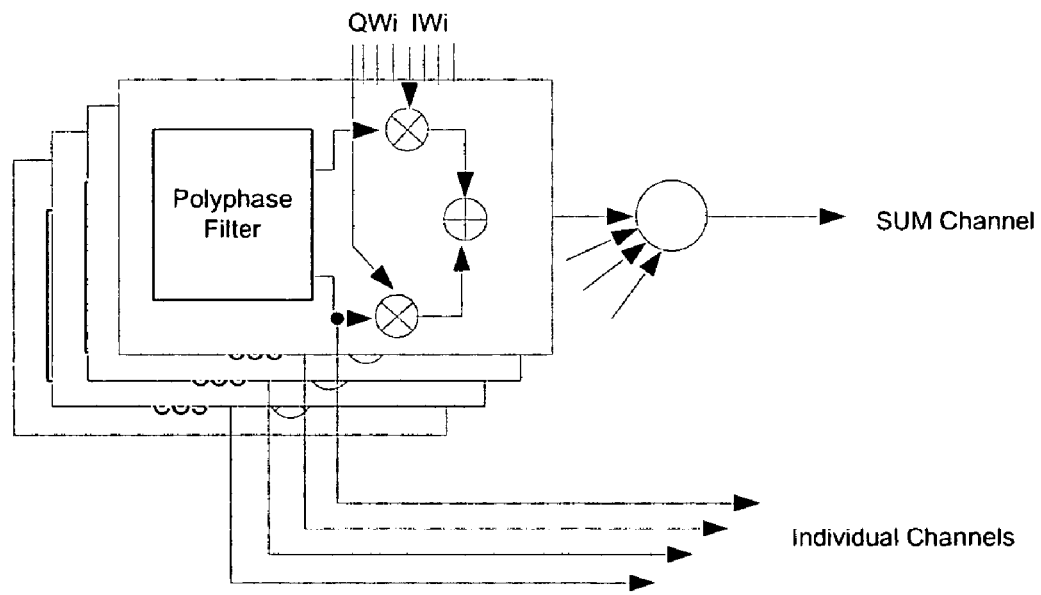

The modulator implementation is shown in FIGS. 4a and 4b. The modulator splits the signal into +45 degree and −45 degree phase shift through a polyphase filter. Each arm is then passed through a multiplier with antenna weights before the two arms are summed. The I and Q channel antenna weight determines the amount phase shift and gain adjustment through the modulator.

FIG. 1 shows an overall block diagram for a time-division duplex (as in 802.11) transmit and receive beam forming system 1. The antenna switch 24a-d can be closed or open in either the receive or transmit direction. For transmit operation, the input signal is split into four ways, each passes through a transmit modulator. The modulator is connected to the same weight as the receive modulator. Once received beam forming is achieved, as described above, a transmit antenna can also form a beam towards the desired signal direction by using the same antenna weights as described above. This can be implemented by freezing the received antenna weight must before the end of signal reception. The antenna weight is held at the same values and is used for transmitting the signal.

It has been found that if the antenna weight setting produces a combined signal which is small in magnitude, the antenna weight thus derived can be small in magnitude, leading to a smaller set of weights. The combined signal thus derived can become small and can be indistinguishable from circuit noise. The receiver noise figure degrades significantly. Also, if the initial weight produces a combined signal which is large in magnitude, the antenna weight thus derived leads to large set of weights resulting in a larger combined signal which can saturate the circuit to generate the antenna weight and the RF modulator. Accordingly, it is desirable to provide an algorithm to maintain the antenna weight magnitude control. In one embodiment, a weight magnitude control loop 23 is added to the closed loop MRC implementation shown in FIG. 1.

In U.S. patent application Ser. No. 10/732,003, filed Dec. 10, 2003, Wireless Communication System Using a Plurality of Antenna Elements with Adaptive Weighting and Combining Techniques, various forms of antenna weight magnitude control loop were described. Since two loops (AGC and antenna weight magnitude control) are employed, potential instability can occur due to interaction of the two loops. In general, the response time of the two loops should differ by a factor of 10 to prevent instability.

As the 802.11 WLAN signal has short preamble, it is desirable that the beam forming operation is accomplished at the beginning of the signal preamble. For example, in 802.11b, it is desirable that the beam forming operation converges within about the first 20 microseconds. For example, in 802.11a/g, it is desirable that the beam forming operation converges within about the first 2 microseconds. To achieve a fast beam forming operation, the bandwidth of the antenna weight magnitude control loop 23 should be wide (fast response time). The AGC loop therefore needs to be extremely fast. Wider loop bandwidth can lead to excessive fluctuations in the AGC loop. Thus, the two loop approach is not suitable for system which requires fast beamforming operation.

Another implementation issue with the INA operation is that integrators 11a-b instead of passive low pass filters are used. If low pass filters instead of integrators 11a-b are used, MRC operation still can achieve the desired signal-to-noise ratio improvement through combining signals, while INA operation cannot effectively cancel the adjacent channel interference. If integrators 11a-b are indeed used, there is no problem mechanism to prevent them from overflowing over time.

Figure 5:
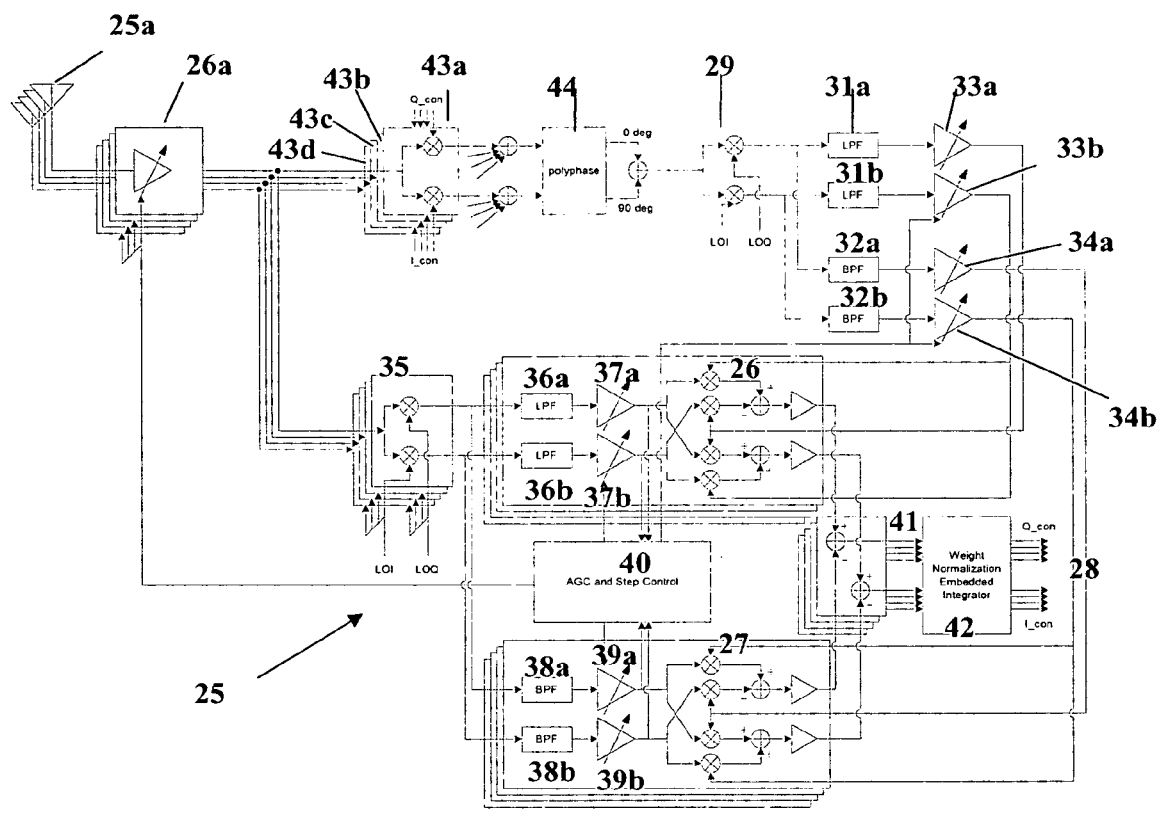
FIG. 5 is a schematic diagram of an implementation of the receive beam forming system of a combined MRC and INA implementation including antenna weight normalization.

FIG. 5 illustrates an implementation of the present invention. Receive beam forming system 25 includes a weight normalization embedded integrator to provide faster convergence and prevent integrator overflow. Receive beam forming system combines MRC beam forming module 26 and INA beam forming module 27 to generate antenna weight (IWi, QWi) 28 with weight normalization. The downconverted signal of downconverter 29 from the combined signal of the four antennas 30 is split into two paths, one path is passed through LPF 31*a-b* and one path is passed through bandpass filters 32*a-b*. Output from low pass filters (LPF) 31*a-b* are amplified with variable gain amplifiers 33*a-b* and is applied to MRC beam forming module 26. Output from bandpass filters 32*a-b* are amplified with variable gain amplifiers 34*a-b*. Output from variable gain amplifiers 34*a-b* is applied to INA beam forming module 27. Similarly, the individual channel signals are also downconverted to baseband at downconverters 35. The baseband signals are split into two paths, one passes through low pass filter (LPF) 36*a-b* and variable gain amplifiers 37*a-b* before being fed into MRC beamforming module 26, one passes through bandpass filter (BPF) 38*a-b* and variable gain amplifiers 39*a-b* before being fed into INA beamforming module 27. AGC and step control loop 40 is used to control the gain of variable gain amplifiers 37*a-b*, 39*a-b*, 33*a-b*, and 35*a-b*.

The resultant error signals 41 of respective MRC beam forming module 26 and INA beam forming module 27 are applied as inputs to weight normalization embedded integrator 42 to generate antenna weight (IWi, QWi) 28.

Figure 6:
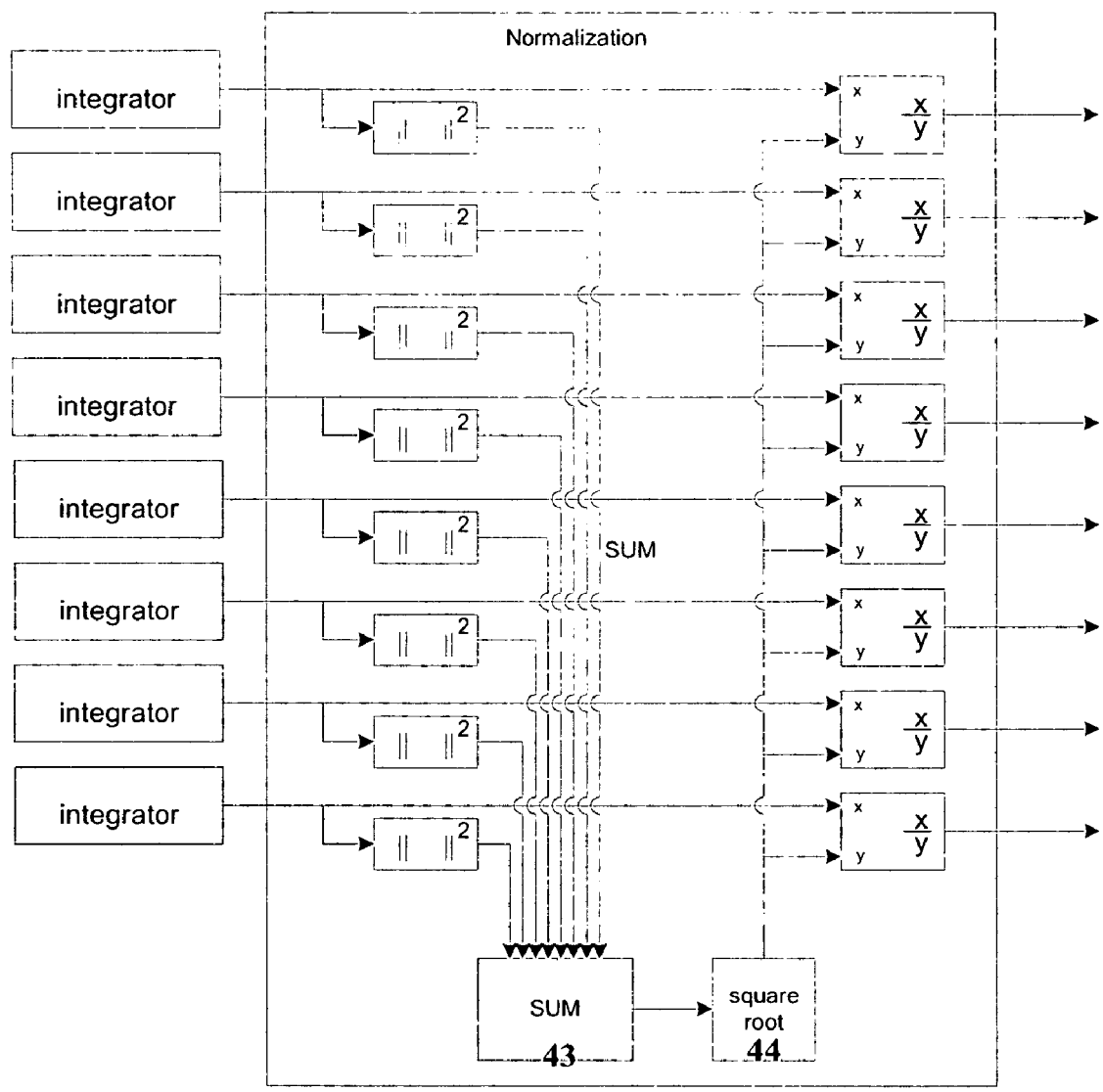
FIG. 6 is a schematic diagram of the weight normalization shown in FIG. 5.

An implementation of weight normalization operation is shown in FIG. 6. The integrator is the same as 11*a-b* in FIG. 1. Inputs of the weight normalization are $WI_k$ and $WQ_k$, where k=1, 2, 3 and 4 are applied to summer 43.

$$\text{The outputs are} \frac{WI_k}{\sqrt{\sum_{m=1}^{4}(WI_m^2 + WQ_m^2)}} \text{ and } \frac{WQ_k}{\sqrt{\sum_{m=1}^{4}(WI_m^2 + WQ_m^2)}},$$

where k=1, 2, 3 and 4 where antenna weight are divided by the output of the square root means 44.

Figure 7:
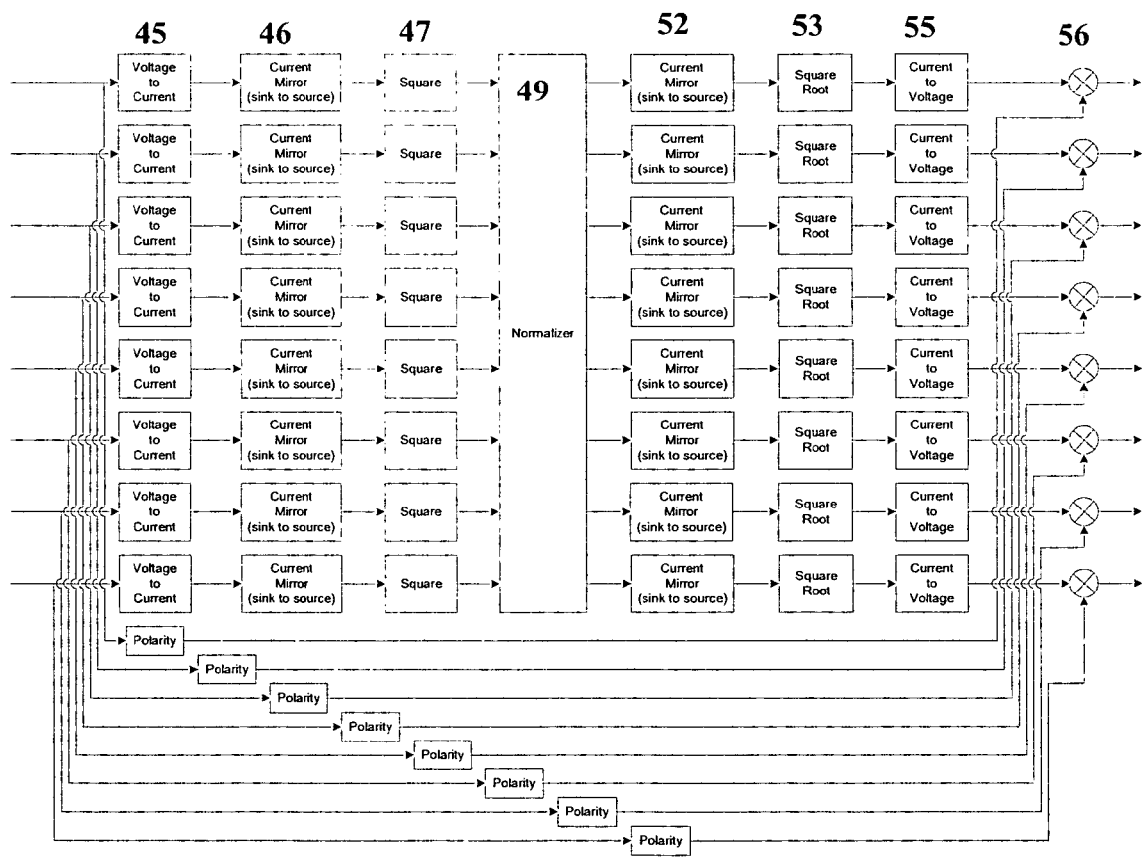
FIG. 7 is a schematic diagram of an embodiment of weight normalization using a current-mode approach.
Figure 8:
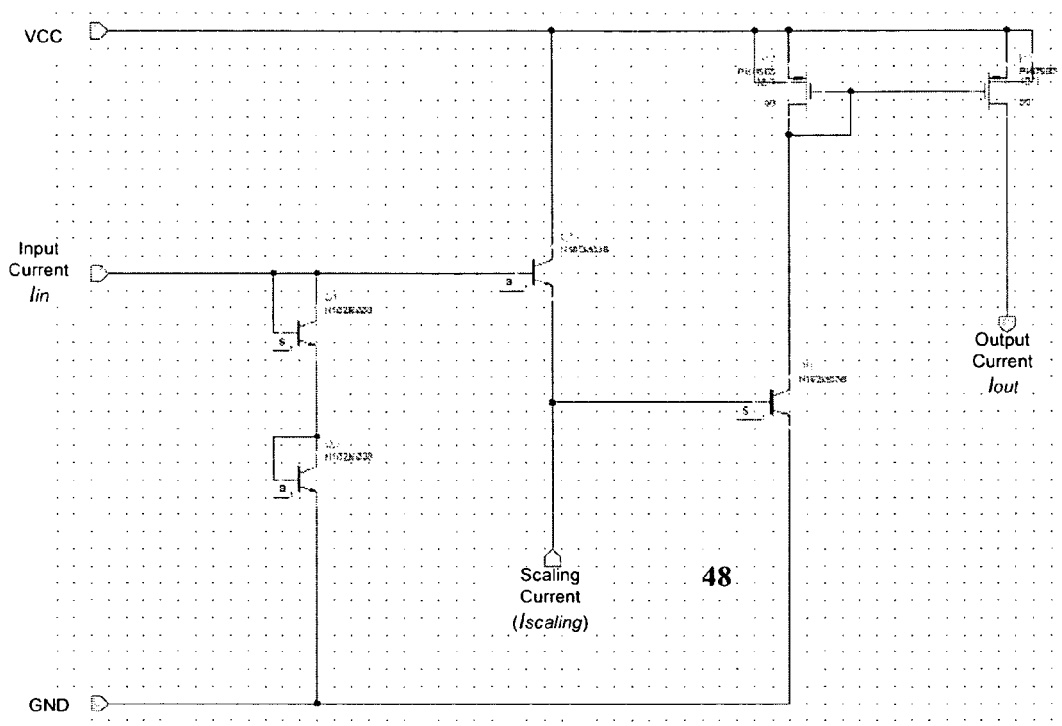
FIG. 8 is a schematic diagram of a circuit for performing a square of the current.

FIG. 7 illustrates a block diagram of an embodiment of weight normalization using a current-mode circuit implementation approach. Input voltages are first transformed into current with corresponding magnitude in block 45. A current mirror (sink to source) is applied in block 46 to transform from sinking current to sourcing current. Squaring operation of the current is performed in block 47. For example, block 47 can be realized with circuit 48 shown in FIG. 8 to square the current value. The output current of the squaring circuit 47 can be represented with equation $$I_{out} = \frac{I_{in}^2}{I_{scaling}},$$

where $I_{in}$ is the input current and $I_{scaling}$ is the scaling current.

Figure 9:
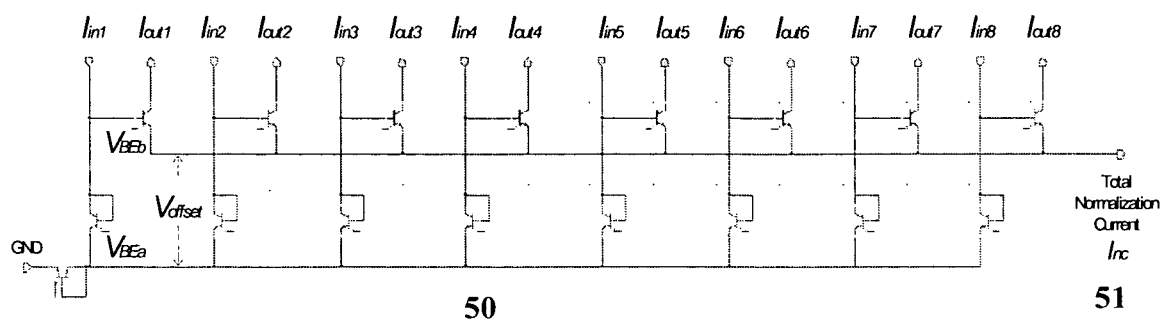
FIG. 9 is a schematic diagram of a circuit for performing normalization.

The squared currents are then fed into normalization block 49. For example, normalization block 49 can be realized with normalization circuit 50 as shown in FIG. 9. For the normalization circuit, the ratios between output currents and input currents are kept constant:

$$\frac{I_{out1}}{I_{in1}} = \frac{I_{out2}}{I_{in2}} = \frac{I_{out3}}{I_{in3}} = \frac{I_{out4}}{I_{in4}} = \frac{I_{out5}}{I_{in5}} = \frac{I_{out6}}{I_{in6}} = \frac{I_{out7}}{I_{in7}} = \frac{I_{out8}}{I_{in8}} = e^{\frac{V_{offset}}{V_T}}$$

and the total output current is equal to the normalization current 51:

$$\sum_{k=1}^{8} I_{outk} = I_{nc}$$

where $I_{outk}$, k=1 to 8 are the normalized output currents.

$I_{ink}$, k=1 to 8 are the input currents.

$V_T$ is the thermal voltage of transistors, which is around 25 mV at room temperature.

$V_{offset} = V_{BEa} - V_{Beb}$.

Figure 10:
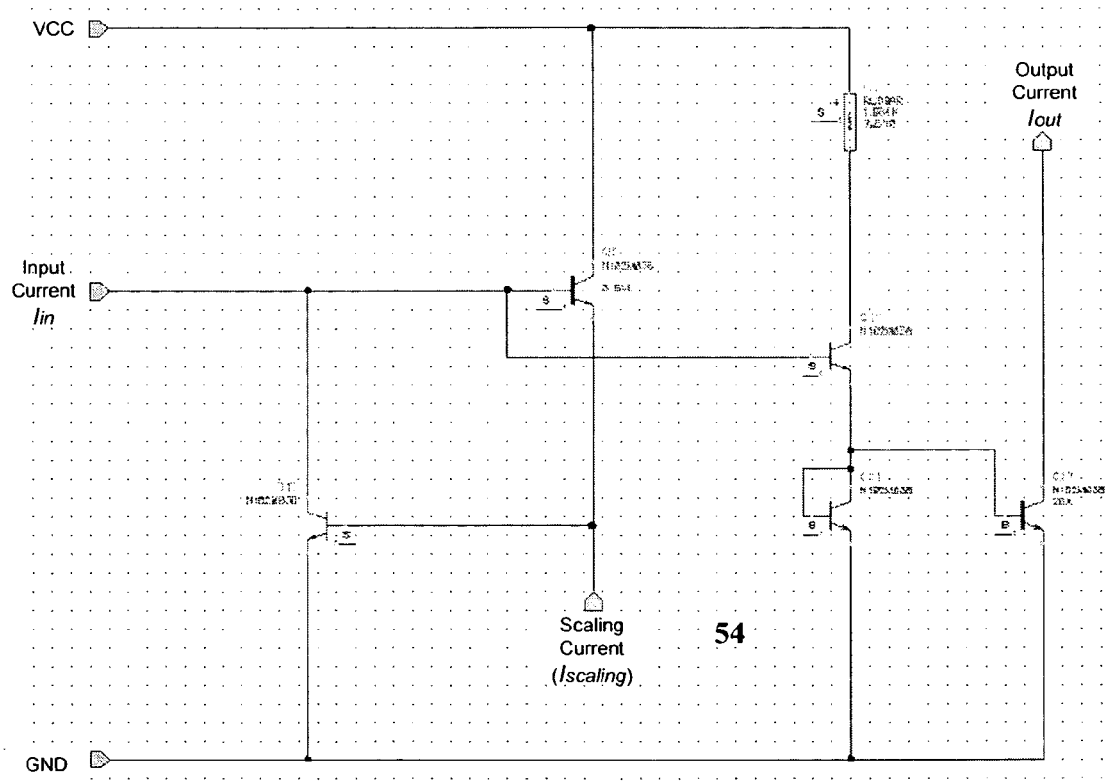
FIG. 10 is a schematic diagram of a circuit for performing a square root of the current.

The normalized squared current is applied to current mirror (sink to source) in block 52 and is passed through square root block 53. An embodiment of the square root block 53 is shown in square root circuit 54 as shown in FIG. 10. The output current of square root circuit 53 can be represented as $I_{out} = \sqrt{I_{in}} \cdot \sqrt{I_{scaling}}$, where $I_{in}$ is the input current and $I_{scaling}$ is the scaling current. The currents are then converted back to voltage in block 55 and the polarities of the input signal are applied back to output in blocks 56. The normalization in FIG. 7 works for MRC only since no mechanism to prevent integrator from overflow.

Figure 11:
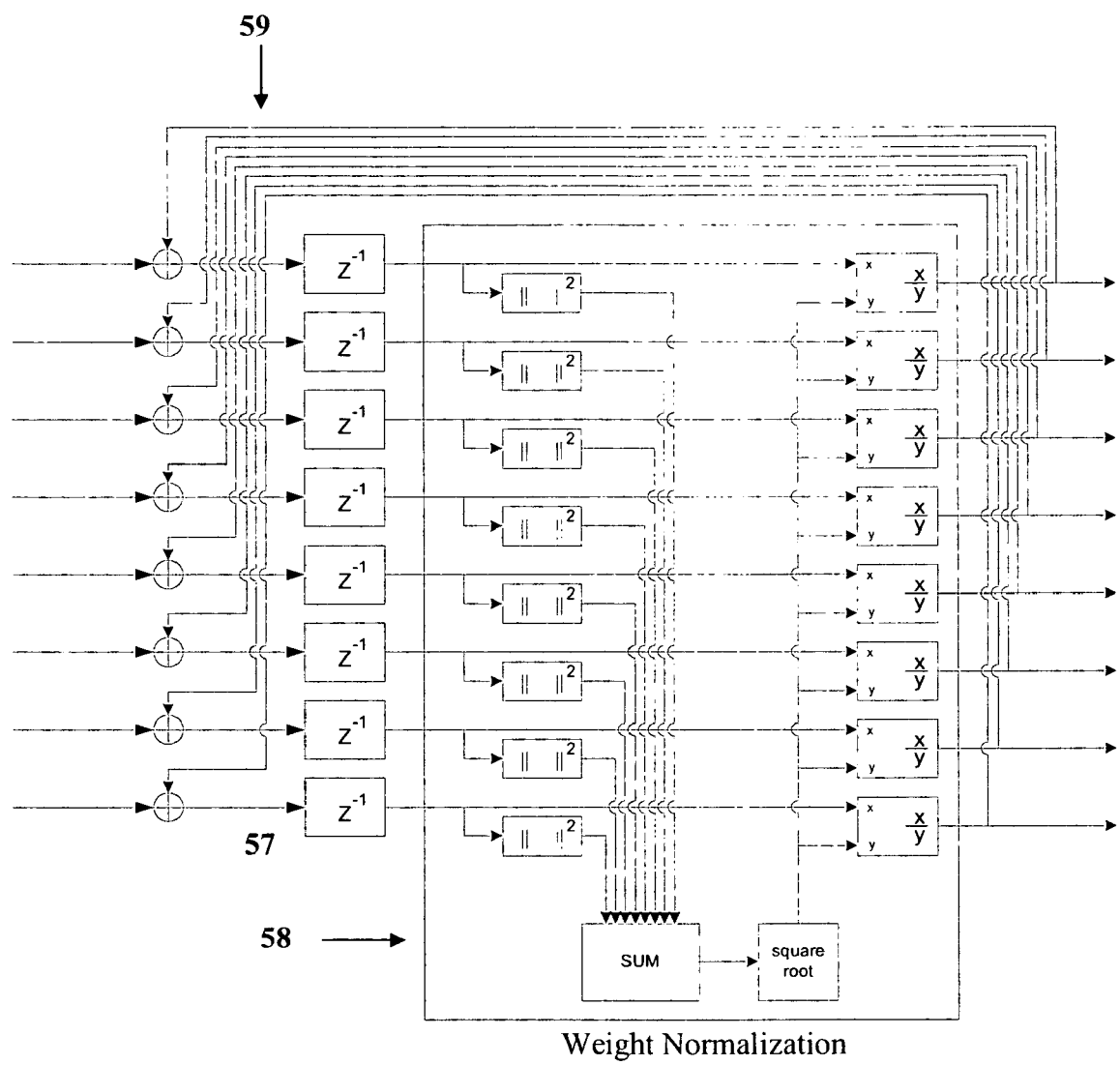
FIG. 11 is a schematic diagram of an alternate embodiment of weight normalization using a digital embodiment.
Figure 12:
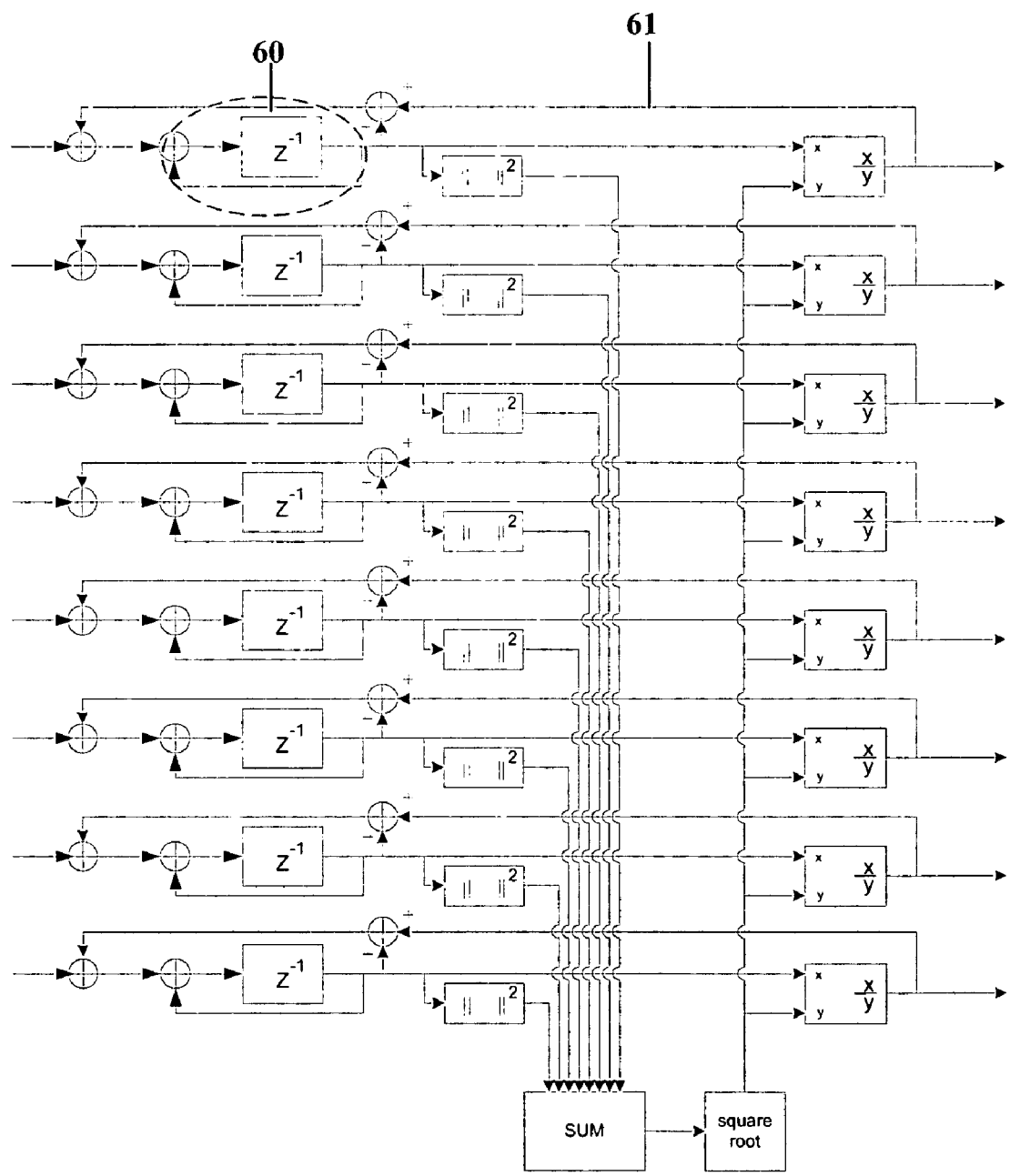
FIG. 12 is a schematic diagram of an alternate embodiment of weight normalization.
Figure 13:
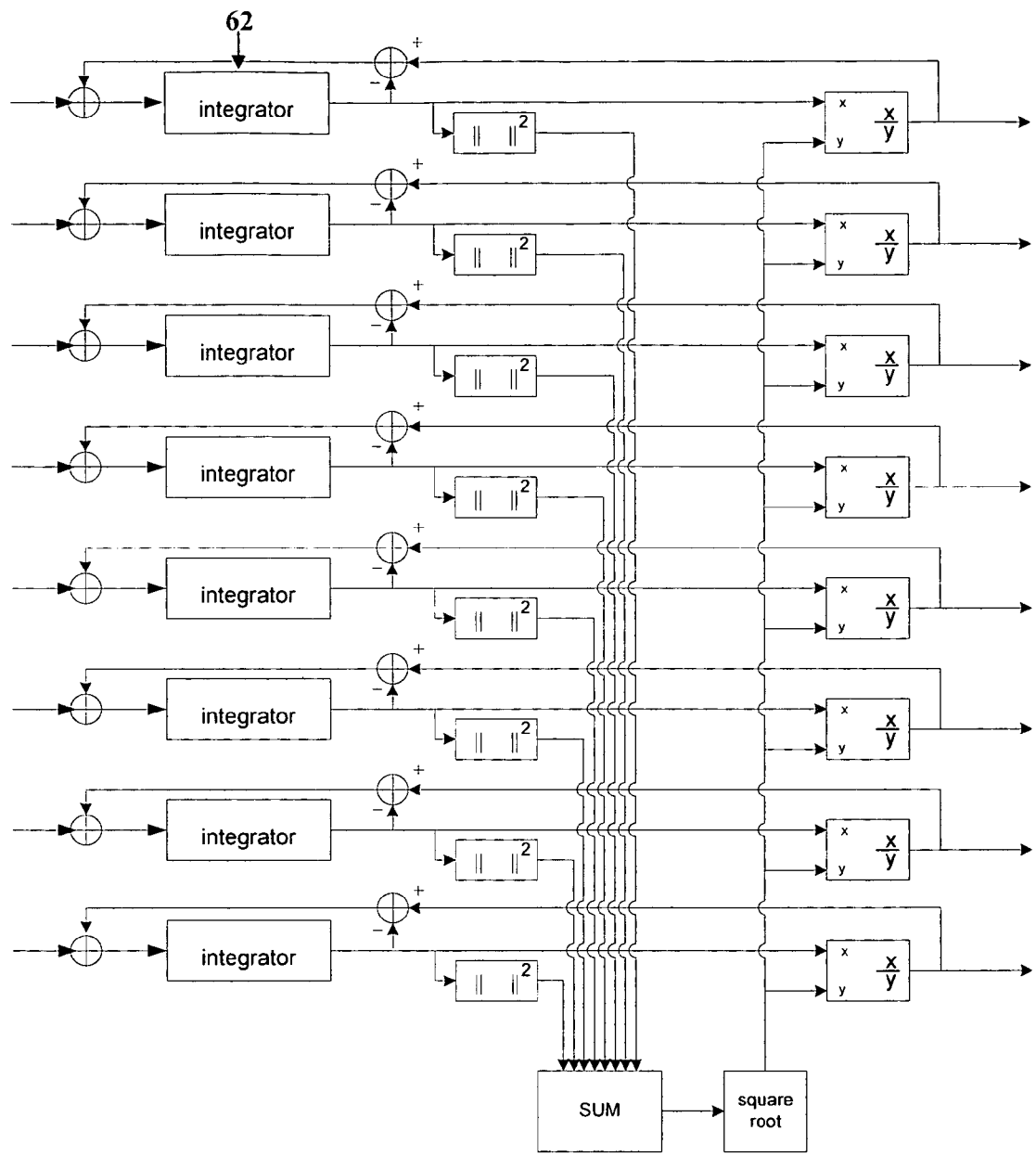
FIG. 13 is a schematic diagram of an alternate embodiment of weight normalization using analog integrator.

FIG. 11 illustrates an alternate embodiment of weight normalization using a digital embodiment, where $Z^{-1}$ in block 57 represents a clock delay. In this implementation, integrator 11*a-b* for the weight computation is incorporated into weight normalization loop. Since the entire weight normalization block 58 is inside accumulation loop 59, no integrator overflow occurs. FIG. 12 illustrates an alternate digital embodiment of weight normalization which performs the same function. In this embodiment, the accumulation loop 60 is embedded within the weight normalization block 61. Accordingly, a conventional analog integrator 62 can be used to realize the corresponding accumulation loop 60 as shown in FIG. 13. The embodiments in FIG. 12 and FIG. 13 do not have an integrator overflow issue since there is a feedback path from output to the input of the integrator.

In many applications, the potential interfering signal can be substantially higher than the desired signal. Input LNA 26 and modulator 43*a-d* in FIG. 5 should have a high compression point to prevent the interfering signal from causing intermodulation. The high compression point circuit typically has high current consumption.

Figure 14:
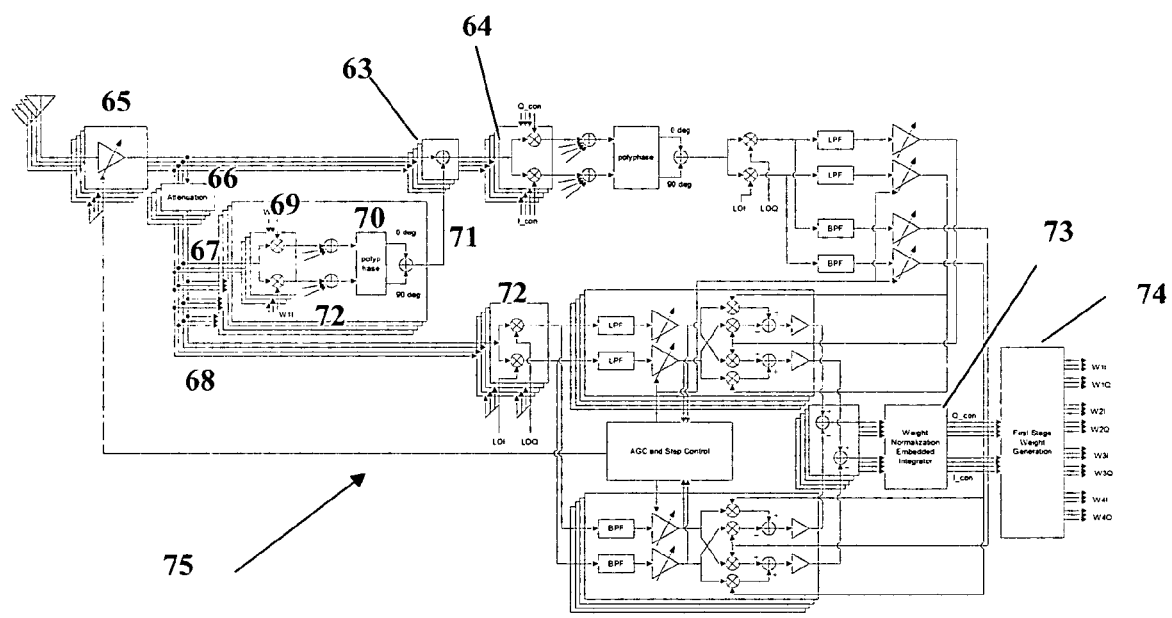
FIG. 14 is a schematic diagram of an alternate implementation of a receive beam forming system for high dynamic range and interference rejection.

FIG. 14 illustrates an improved implementation of the RF frontend in the receive beam forming system 75 including a weight normalization embedded integrator to keep the linearity even under severely interfered environment. The interference is subtracted at 63 before reaching modulators 64 to prevent compression problem in modulator 64. The proposed RF frontend is capable of operating in an environment in which interfering signal is significantly higher than the desired signal.

Outputs of amplifiers 65 are attenuated with attenuator 66 and used for generating interference cancellation signals 77. Output from attenuator 66 is split into two paths. First path 67 is weighted with signals from other antennas using modulators 69 and polyphase filter 70 to form signal 71 for interference subtraction. Signals are combined in combiner 72 and are used to cancel interference at the LNA 65 output. For each channel at the output of LNA 65, the combined signal of the other three channels are used as cancellation signal at 63.

Second path 68 is fed into downconverters 76 for weight calculation. The weight generation algorithm using the combined MRC and INA algorithm is the same as described above, in addition to weight generation for modulator 64. Another 12 complex weights are generated for use in the interference cancellation signals 77, as following:

Let $WCON_i = I\_CON_i + j*Q\_CON_i$, where i=1, 2, 3 or 4, be the weights generated from the combined MRC and INA algorithm. The combined signal is $$\sum_{i=1}^{4} R_i \cdot WCON_i,$$

whose interference component is suppressed by the INA algorithm. In order to keep the interference component low at the modulator input, the received signal on antenna 78a, $R_1$, is added with interference cancellation signal formed from other 3 antennas 78b-d

$$R_2 \cdot \frac{WCON_2}{WCON_1} + R_3 \cdot \frac{WCON_3}{WCON_1} + R_4 \cdot \frac{WCON_4}{WCON_1}$$

in the interference cancellation combining 63. Similar operation is applied to the other channels. Accordingly, the operation on the modulator 64 combining becomes:

$$WCON_1 \cdot \left(R_1 + R_2 \cdot \frac{WCON_2}{WCON_1} + R_3 \cdot \frac{WCON_3}{WCON_1} + R_4 \cdot \frac{WCON_4}{WCON_1}\right) +$$

$$WCON_2 \cdot \left(R_2 + R_2 \cdot \frac{WCON_1}{WCON_2} + R_3 \cdot \frac{WCON_3}{WCON_2} + R_4 \cdot \frac{WCON_4}{WCON_2}\right) +$$

$$WCON_3 \cdot \left(R_3 + R_2 \cdot \frac{WCON_1}{WCON_3} + R_3 \cdot \frac{WCON_2}{WCON_3} + R_4 \cdot \frac{WCON_4}{WCON_3}\right) +$$

$$WCON_4 \cdot \left(R_4 + R_2 \cdot \frac{WCON_1}{WCON_4} + R_3 \cdot \frac{WCON_2}{WCON_4} + R_4 \cdot \frac{WCON_4}{WCON_4}\right) =$$

$$4(WCON_1 \cdot R_1 + WCON_1 \cdot R_1 + WCON_1 \cdot R_1 + WCON_1 \cdot R_1)$$

The weights for cancellation signals generated by the weight generation module 77 can be written as:

$$W1_i = W1I_i + j*W1Q_i = \frac{WCON_i}{WCON_1}, i = 2, 3 \text{ or } 4$$

$$W2_i = W2I_i + j*W2Q_i = \frac{WCON_i}{WCON_2}, i = 1, 3 \text{ or } 4$$

$$W3_i = W3I_i + j*W3Q_i = \frac{WCON_i}{WCON_3}, i = 1, 2 \text{ or } 4$$

$$W4_i = W4I_i + j*W4Q_i = \frac{WCON_i}{WCON_4}, i = 1, 2 \text{ or } 3.$$

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A method for operating a wireless communication system receiver comprising the steps of: receiving a plurality of input signals; generating weights to be applied to each of said input signals by a combination of maximal ratio combining (MRC) to align phases of said input signals to the same phase and to scale said input signals in proportion to a square root of a received signal-to-noise ratio and an interference nulling algorithm (INA) for generating said weights to align phases of said input signals to 180 degree opposite of a SUM channel and to scale said input signal in proportional to an envelop of said input signal; applying weight normalization to said weights generated by said combination of maximal ratio combining (MRC) and an interference nulling algorithm (TNA); weighting said plurality of input signals with said weights generated by weight normalization; and combining said weighted plurality of signals to form an output signal.

2. The method of claim 1 wherein said weight normalization is performed by the steps of: scaling said weights generated by said combination of maximal ratio combining (MRC) and an interference nulling algorithm (TNA) to a proper level for combining.

3. A method for operating a wireless communication system receiver comprising the steps of: receiving a plurality of input signals; generating weights to be applied to each of said input signals by a combination of maximal ratio combining (MRC) to align phases of said input signals to the same phase and to scale said input signals in proportion to a square root of a received signal-to-noise ratio and an interference nulling algorithm (INA) for generating said weights to align phases of said input signals to 180 degree opposite of a SUM channel and to scale said input signal in proportional to an envelop of said input signal; applying weight normalization to said weights generated by said combination of maximal ratio combining (MRC) and an interference nulling algorithm (TNA); weighting said plurality of input signals with said weights generated by weight normalization; and combining said weighted plurality of signals to form an output signal;
comprising: four input signals wherein inputs to the weight normalization are $$\frac{WI_k}{\sqrt{\sum_{m=1}^{4}(WI_m^2 + WQ_m^2)}} \text{ and } \frac{WQ_k}{\sqrt{\sum_{m=1}^{4}(WI_m^2 + WQ_m^2)}},$$

where k = 1, 2, 3 and 4.

4. The method of claim 3 wherein said weights are generated as error signals and weight normalization is performed by the steps of: transforming input voltages of each of said error signals into current; squaring said current of each of said error signals; normalizing said squared current of each of said error signals; square rooting said normalized current of each of said error signals; and transforming said square rooted current of each of said error signals into an output voltage of each of said error signals.

5. The method of claim 4 further comprising the step of: correcting polarity of each of said error signals.

6. The method of claim 3 wherein said weight normalization is performed digitally using a clock delay.

7. The method of claim 6 wherein said weight normalization comprises a weight normalization loop and a weight accumulation loop.

8. The method of claim 7 wherein said accumulation loop is isolated from said normalization loop.

9. The method of claim 6 wherein an analog integrator is used in said normalization loop.

10. The method of claim 7 comprising means for preventing said integrator from overflow in said normalization loop.

11. The method of claim 3 further comprising the step of: subtracting interference from said input signals before said step of weighting said plurality of input signals.

12. A method for operating a wireless communication system receiver comprising the steps of: splitting a plurality of input signals into a first path and a second path; generating first weights to be applied to said input signals of said first path for interference cancellation; generating second weights to be applied to said input signals of said second path by a combination of maximal ratio combining (MRC) to align phases of said input signals to the same phase and to scale said input signals in proportion to a square root of a received signal-to-noise ratio and an interference nulling algorithm (INA) for generating said weights to align phases of said input signals to 180 degree opposite of a SUM channel and to scale said input signal in proportional to an envelop of said input signal; applying weight normalization to said second weights generated by said combination of maximal ratio combining (MRC) and an interference nulling algorithm (INA) for generating second normalized weights; and weighting said plurality of input signals with said first weights and said second normalized weights.

13. A method for operating a wireless communication system receiver comprising the steps of: splitting a plurality of input signals into a first path and a second path; generating first weights to be applied to said input signals of said first path for interference cancellation; generating second weights to be applied to said input signals of said second path by a combination of maximal ratio combining (MRC) to align phases of said input signals to the same phase and to scale said input signals in proportion to a square root of a received signal-to-noise ratio and an interference nulling algorithm (INA) for generating said weights to align phases of said input signals to 180 degree opposite of a SUM channel and to scale said input signal in proportional to an envelop of said input signal; applying weight normalization to said second weights generated by said combination of maximal ratio combining (MRC) and an interference nulling algorithm (INA) for generating second normalized weights; and weighting said plurality of input signals with said first weights and said second normalized weights;
wherein said first weights are generated from said second weights combined with each of said input signal being added with a second signal from a combination of other of said input signals.

14. The method of claim 13 wherein a high level interference signal is cancelled in the receiver frontend.

15. The method of claim 13 comprising four input signals wherein said first weights are $$W1_i = W1I_i + j*W1Q_i = \frac{WCON_i}{WCON_1}, i = 2, 3 \text{ or } 4$$

$$W2_i = W2I_i + j*W2Q_i = \frac{WCON_i}{WCON_2}, i = 1, 3 \text{ or } 4$$

$$W3_i = W3I_i + j*W3Q_i = \frac{WCON_i}{WCON_3}, i = 1, 2 \text{ or } 4$$

-continued
$$W4_i = W4I_i + j*W4Q_i = \frac{WCON_i}{WCON_4}, i = 1, 2 \text{ or } 3.$$

16. A system for operating a wireless communication system receiver comprising: means for receiving a plurality of input signals; means for generating weights to be applied to each of said input signals by a combination of maximal ratio combining (MRC) to align phases of said input signals to the same phase and to scale said input signals in proportion to a square root of a received signal-to-noise ratio and an interference nulling algorithm (INA) for generating said weights to align phases of said input signals to 180 degree opposite of a SUM channel and to scale said input signal in proportional to an envelop of said input signal; means for applying weight normalization to said weights generated by said combination of maximal ratio combining (MRC) and an interference nulling algorithm (INA); means for weighting said plurality of input signals with said weights generated by weight normalization; and means for combining said weighted plurality of signals to form an output signal.

17. The system of claim 16 wherein said weight normalization is performed by: means for summing said weights generated by said combination of maximal ratio combining (MRC) and an interference nulling algorithm (INA); and means for scaling the weights to a proper level for combining.

18. A system for operating a wireless communication system receiver comprising: means for receiving a plurality of input signals; means for generating weights to be applied to each of said input signals by a combination of maximal ratio combining (MRC) to align phases of said input signals to the same phase and to scale said input signals in proportion to a square root of a received signal-to-noise ratio and an interference nulling algorithm (INA) for generating said weights to align phases of said input signals to 180 degree opposite of a SUM channel and to scale said input signal in proportional to an envelop of said input signal; means for applying weight normalization to said weights generated by said combination of maximal ratio combining (MRC) and an interference nulling algorithm (INA); means for weighting said plurality of input signals with said weights generated by weight normalization;

and means for combining said weighted plurality of signals to form an output signal;

comprising: four input signals wherein inputs to the weight normalization are $$\frac{WI_k}{\sqrt{\sum_{m=1}^{4}(WI_m^2 + WQ_m^2)}} \text{ and } \frac{WQ_k}{\sqrt{\sum_{m=1}^{4}(WI_m^2 + WQ_m^2)}},$$

where $k = 1, 2, 3$ and $4$.

19. The system of claim 18 wherein said weights are generated as error signals and weight normalization is performed by: means for transforming input voltages of each of said error signals into current; means for squaring said current of each of said error signals; means for normalizing said squared current of each of said error signals; means for square rooting said normalized current of each of said error signals; and means for transforming said square rooted current of each of said error signals into an output voltage of each of said error signals.

20. The system of claim 19 further comprising: means for correcting polarization of each of said error signal.

21. The system of claim 20 wherein said weight normalization is performed digitally using a clock delay.

22. The system of claim 21 wherein said weight normalization comprises a weight normalization loop and a weight accumulation loop.

23. The system of claim 22 wherein said accumulation loop is isolated from said normalization loop.

24. The system of claim 22 wherein an analog integrator is used in the said normalization loop.

25. The system of claim 22 further comprising: means for preventing said analog integrator from overflow in said normalization loop.

26. The system of claim 18 further comprising: means for subtracting interference from said input signals before weighting said plurality of input signals.

27. A system for operating a wireless communication system receiver comprising: means for splitting a plurality of input signals into a first path and a second path; means for generating first weights to be applied to said input signals of said first path; means for generating second weights to be applied to said input signals of said second path by a combination of maximal ratio combining (MRC) to align phases of said input signals to the same phase and to scale said input signals in proportion to a square root of a received signal-to-noise ratio and an interference nulling algorithm (INA) for generating said weights to align phases of said input signals to 180 degree opposite of a SUM channel and to scale said input signal in proportional to an envelop of said input signal; means for applying weight normalization to said weights generated by said combination of maximal ratio combining (MRC) and an interference nulling algorithm (INA) for generating second normalized weights; and means for weighting said plurality of input signals with said weights generated by weight normalization.

28. The system of claim 27 wherein said first weights are generated from said second weights combined with each of said input signal being added with a second signal from a combination of other of said input signals.

29. The system of claim 27 wherein high level interference signal is cancelled in the receiver frontend.

30. A system for operating a wireless communication system receiver comprising: means for splitting a plurality of input signals into a first path and a second path; means for generating first weights to be applied to said input signals of said first path; means for generating second weights to be applied to said input signals of said second path by a combination of maximal ratio combining (MRC) to align phases of said input signals to the same phase and to scale said input signals in proportion to a square root of a received signal-to-noise ratio and an interference nulling algorithm (INA) for generating said weights to align phases of said input signals to 180 degree opposite of a SUM channel and to scale said input signal in proportional to an envelop of said input signal; means for applying weight normalization to said weights generated by said combination of maximal ratio combining (MRC) and an interference nulling algorithm (INA) for generating second normalized weights; and means for weighting said plurality of input signals with said weights generated by weight normalization;

wherein said first weights are generated from said second weights combined with each of said input signal being added with a second signal from a combination of other of said input signals comprising four input signals wherein said first weights are $$W1_i = W1I_i + j*W1Q_i = \frac{WCON_i}{WCON_1}, i = 2, 3 \text{ or } 4$$

$$W2_i = W2I_i + j*W2Q_i = \frac{WCON_i}{WCON_2}, i = 1, 3 \text{ or } 4$$

$$W3_i = W3I_i + j*W3Q_i = \frac{WCON_i}{WCON_3}, i = 1, 2 \text{ or } 4$$

$$W4_i = W4I_i + j*W4Q_i = \frac{WCON_i}{WCON_4}, i = 1, 2 \text{ or } 3.$$

* * * * *